Figure 1:
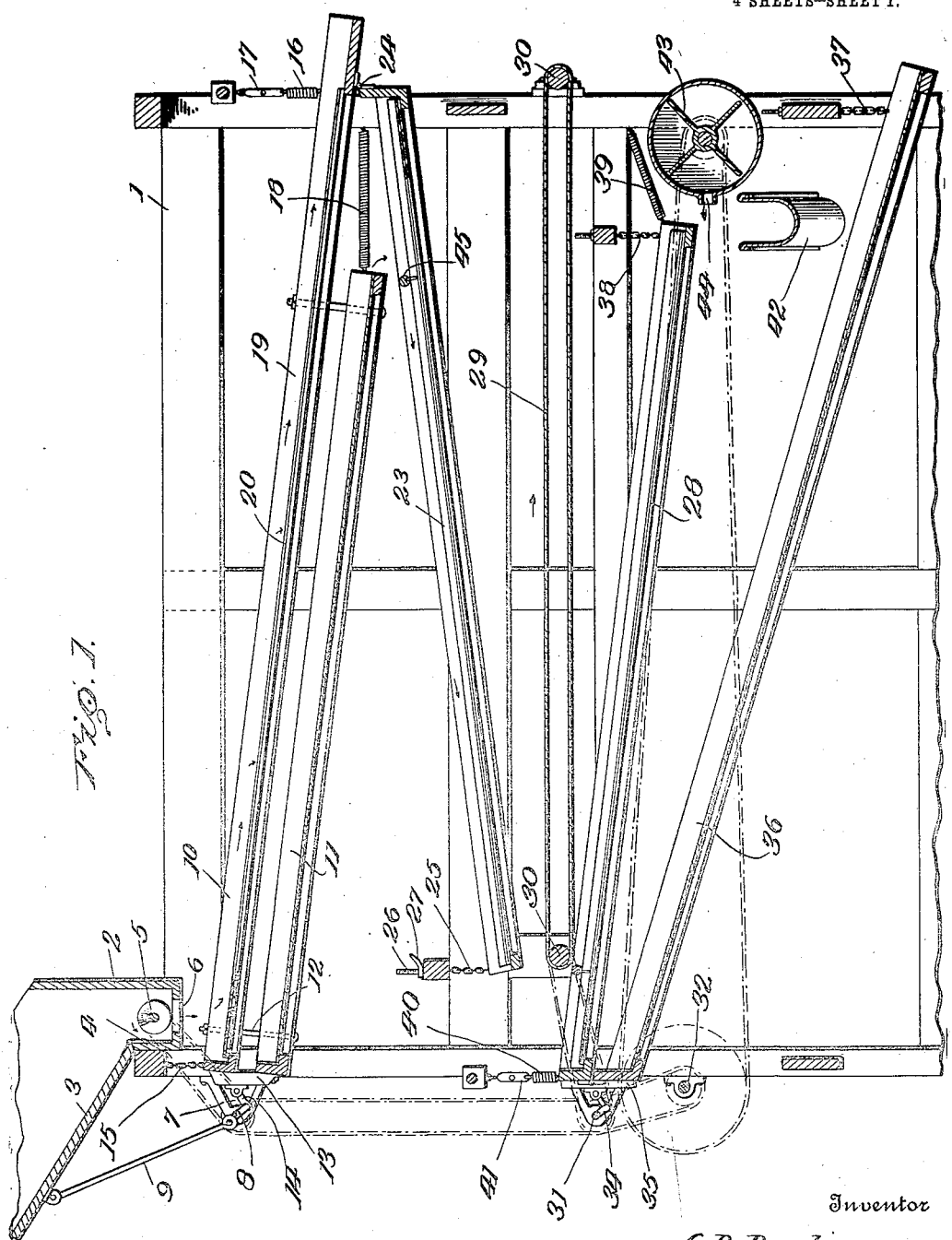

C. D. PANTAZE.
SEED SEPARATOR.
APPLICATION FILED JULY 2, 1912.

1,118,221.

Patented Nov. 24, 1914.
4 SHEETS—SHEET 1.

Inventor
C. D. Pantaze

Witnesses

By
Attorneys.

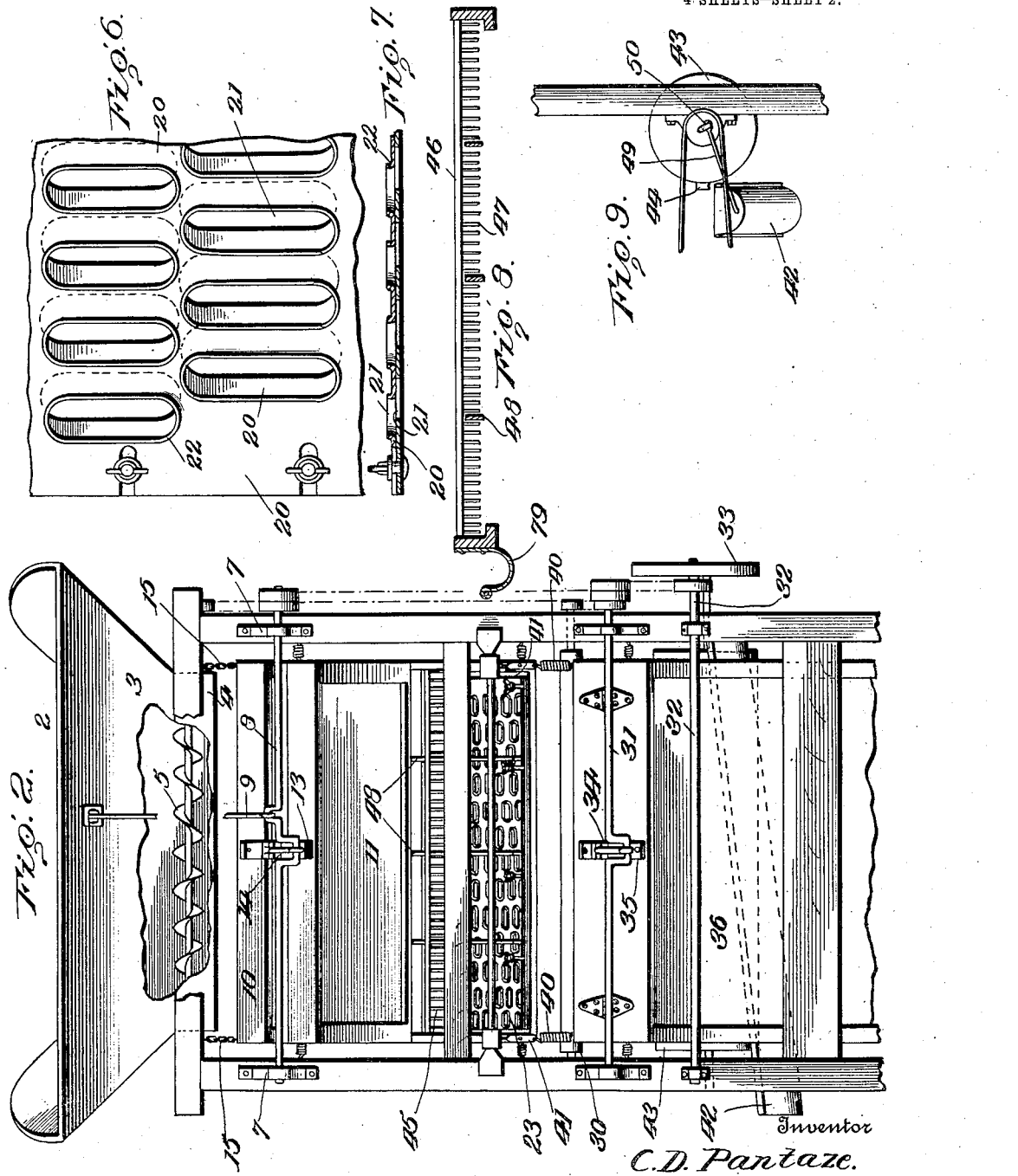

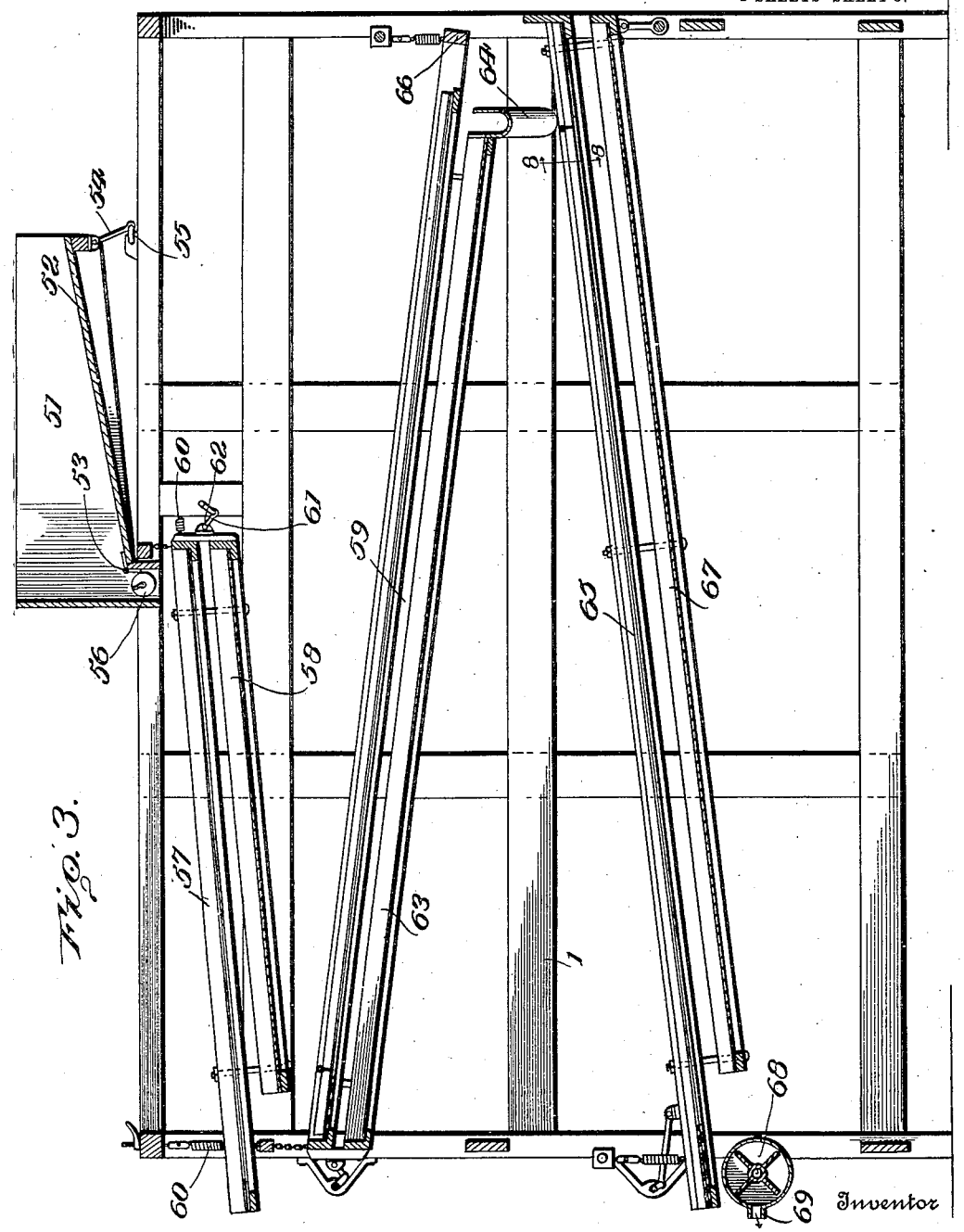

C. D. PANTAZE.
SEED SEPARATOR.
APPLICATION FILED JULY 2, 1912.
1,118,221.
Patented Nov. 24, 1914.
4 SHEETS—SHEET 4.
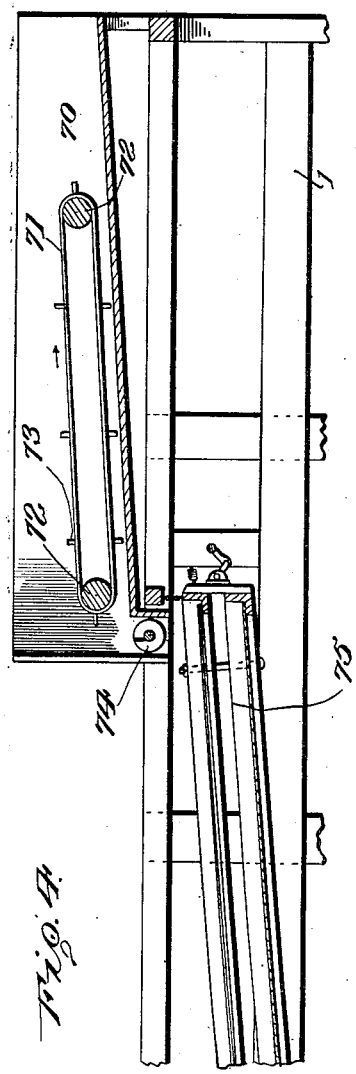
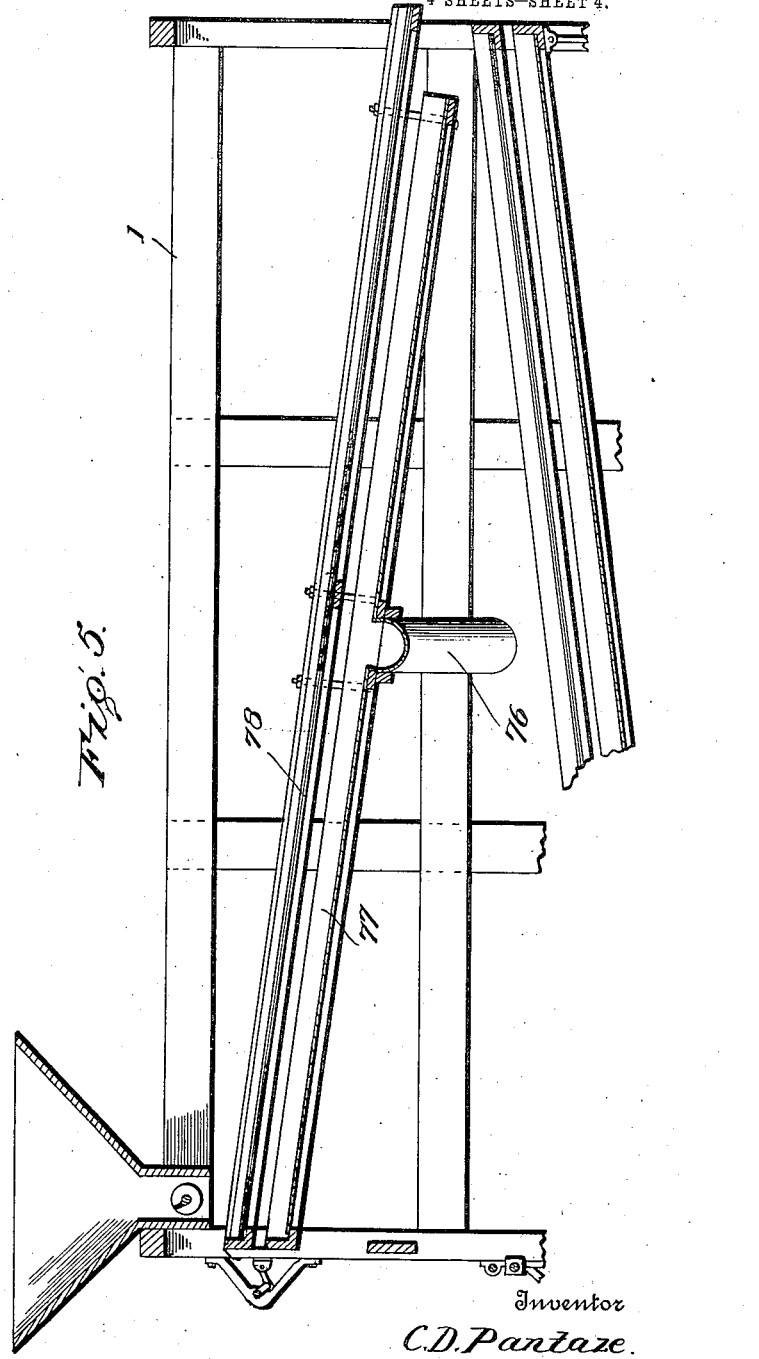
Inventor
C. D. Pantaze.
Witnesses
By
Attorneys

UNITED STATES PATENT OFFICE.

CHARLES D. PANTAZE, OF BIRMINGHAM, ALABAMA.

SEED-SEPARATOR.

1,118,221.  Specification of Letters Patent.  Patented Nov. 24, 1914.

Application filed July 2, 1912. Serial No. 707,291.

*To all whom it may concern:*

Be it known that I, CHARLES D. PANTAZE, citizen of the United States, residing at Birmingham, in the county of Jefferson and State of Alabama, have invented certain new and useful Improvements in Seed-Separators, of which the following is a specification.

My invention relates to seed separators, and has for its object the provision of a simple and efficient apparatus especially adapted for separating trash and immature cotton seeds from the fully developed seeds so that the planter may be supplied with seeds of proper quality for planting.

The invention consists in certain novel features of construction, arrangement, and operation which will be hereinafter first fully described and then more particularly pointed out in the claim following the description.

The invention is illustrated in the accompanying drawings, in which:—

Figure 1 is a vertical longitudinal section of a seed separator embodying my improvements; Fig. 2 is an end elevation of the same; Fig. 3 is a vertical longitudinal section showing a modification; Fig. 4 is a detail longitudinal section showing a further modification; Fig. 5 is a similar view showing a still further modification; Fig. 6 is a detail plan view of a portion of the screen; Fig. 7 is a detail section of a portion of the screen; Fig. 8 is a detail transverse section taken on the line 8—8 of Fig. 3; Fig. 9 is a detail view of the mechanism for vibrating the discharge chute.

In carrying out my invention, I employ a supporting frame 1 which may be of any desired dimensions and is constructed of standards or posts and longitudinal and transverse beams and sills connecting the same, as will be readily understood. At the top of the frame and at one end thereof, I secure a hopper 2 having its front side 3 hinged to the front transverse wall 4 of a trough formed in the lower end of the hopper, as clearly shown in Fig. 1. Within the said trough is disposed a worm or spiral conveyer 5 which is so constructed, as shown in Fig. 2, that it will feed toward the opposite ends of the trough from the center of the same, a plurality of discharge openings 6 being provided in the bottom of the trough, as shown and as will be readily understood.

Brackets 7 of any convenient formation are secured to the end of the main frame 1, and in the said brackets is journaled a crank shaft 8 which is connected by a link 9 with the hinged front wall 3 of the hopper, so that, as the said shaft is rotated, the wall of the hopper will be vibrated and consequently the seed within the hopper will be agitated so that they will be caused to flow positively to the conveyer 5 and will be prevented from choking in the hopper.

Suspended within the frame, so that its upper end is directly beneath the discharge opening 6, is an inclined screen 10 to which is secured a pan or trough 11 by bolts 12, so that the said pan or trough, which is arranged below the screen, will be caused to move with the screen and be fixed in its position relative to the same. A bracket or block 13 is secured to the front upper ends of the screen 10 and the pan or trough 11, and this block or bracket is connected by a link 14 with the crank shaft 8 so that the desired vibratory movement will be imparted to the screen. The screen is suspended at its upper end by chains or other flexible connections 15 and at its lower end by a spring or springs 16 which is secured to the screen frame and to a turn-buckle 17, the said turn-buckle being also secured to the main frame at any desired point. The turn-buckle permits the tension of the spring to be adjusted or regulated as may be desired, and it and the spring connected therewith may be disposed at any convenient or preferred point of the screen frame and the main supporting frame. The spring will provide a yieldable support for the screen so that the vibrations imparted to the screen by the crank shaft will be amplified and the agitation of the seeds resulting from the vibration of the screen will be increased and the desired separation rapidly attained. A spring 18 is also arranged between the pan or trough 11 and the main supporting frame so as to further amplify the vibrations.

The screen consists of the usual frame or supporting rim, indicated at 19, and metallic plates 20 which are constructed with transverse slots or perforations 21 of any desired form and preferably in the form of oblong slots having semi-circular ends. Two of these plates are employed, arranged in superposed relation and adapted to be shifted relatively to each other so that the free openings or passages through the plates may be varied as may be necessary to properly treat the seed passing through the machine. The openings in the upper plate are preferably formed by stamping out a portion thereof and striking up the edges of the openings, thereby formed so that ridges 22 will be provided upon the upper surface of the screen to aid in the deflection and agitation of the seed and other material passing over the screen.

By referring to Fig. 1, it will be noted that the lower rear ends of the screen frame and of the trough or pan 11 are open so that the material which reaches said ends may pass over the same, and to the lower end of the screen, I secure a second screen 23 which may be of the same construction and is secured to the upper screen by a hinge 24 so that it may have a slight vibratory movement relative to the upper screen. The forward end of this second screen 23 is supported by a chain or other flexible connection 25 which may be extended to any convenient point of the main frame and is equipped with a screw or bolt 26 extending through that portion of the frame to which it is attached and adjustable by means of a wing nut 27 so that the screen may be given any desired inclination. The rear end of the pan 11 is spaced forwardly from the upper end of the second screen 23 so that the seeds and other material deposited on the trough or pan will be discharged therefrom onto the second screen, as will be readily understood. The plates 20 in the upper screen should be so adjusted that all the seeds will pass therethrough and only the leaves, sticks, and other trash will be separated therefrom, the trash passing out over the rear end of the screen, while the seeds drop onto the pan 11 and are discharged from the same onto the screen 23. The perforated plates of the screen 23 should be so adjusted as to permit the immature and undeveloped seeds to drop through the same, while the larger seeds will pass over the forward end of the screen and be deposited upon a third screen 28.

The conveyer belt 29 is supported upon suitable rollers 30 below the screen 23, and the refuse and immature seeds dropping onto the said belt will be carried by the same to the rear end of the machine and there discharged. This belt may be driven from a crank shaft 31 which in turn is connected by a belt and pulleys with the main driving shaft 32 equipped with a band pulley 33 whereby motion may be imparted to said shaft from any convenient engine or prime motor. The crank shaft 31 is also connected by a link 34 with a bracket or block 35 secured to the front end of the screen 28 and the collecting pan or trough 36 disposed below the same, so that the said screen and trough will be vibrated to agitate the material deposited thereon and cause the same to pass to the rear open ends of the screen and trough, as will be readily understood. The trough or pan 36 is attached at its upper end to the screen 28 and is supported at its lower end by a chain or other flexible connection 37, as shown. The screen 28 is supported by a chain 38 adjustably attached to any convenient part of the main supporting frame, and springs 39 and 40 are also attached to the said screen and the main frame so as to amplify the vibrations imparted thereto, as will be readily understood, the spring 40 being connected with the main frame through a turn-buckle 41 so that the tension of the spring may be regulated as may be desired. Arranged adjacent the lower rear end of the screen 28 is a transverse chute 42 adapted to receive the seeds discharged from the said screen and conduct the same to the side of the machine where they will be caught in a suitable receptacle. Just above the said chute 42 is a fan or blower 43 having its casing provided with a discharge opening or outlet 44 directed toward the chute so that the blast from the fan will play through the seeds dropping into the chute and blow from the same any dust or other light foreign matter which may have adhered to the seed. The screen 23 will be so adjusted as to permit the small and worthless seed to drop onto the conveyer 29, while the good seed will be carried over the end of the said screen and discharged onto the screen 28. The said screen 28 will be so adjusted that the first quality seed will be caused to travel over the screen and be discharged into the chute 42, while the poorer or second quality seed will drop onto the trough or pan 36 and be discharged from the lower rear end of the same.

Disposed transversely in the screens 23 and 28 and adjacent the upper ends thereof are combs 45 consisting of a bar 46 and pins or teeth 47 depending therefrom, the said combs serving to retard the flow of the seeds so that they will pass over the screens in well defined separated streams and consequently cannot crowd over the openings in the screens in such a volume as to choke the openings and prevent the proper grading and separation of the seeds. To further insure this preliminary separating of the seeds, division strips 48 are disposed longitudinally upon the screens so as to prevent the seeds flowing laterally over the surface of the screen and consequently cause them to pass positively to the openings in the screens.

It will be readily seen that my improved machine will clean and separate the seeds into grades very rapidly and effectually, inasmuch as all the working parts are given a vibratory motion, and, as the several screens are flexibly supported, this vibratory motion will be very free and even so that the seeds will be fed positively and rapidly over the screening surfaces and consequently be very quickly divided into classes. Choking of the seeds at any point cannot occur, inasmuch as the hopper is also subjected to a vibratory or shaking action and a positive feeding conveyer is provided in the bottom of the hopper to force the seeds to the discharge openings therein. The discharge chute 22 is flexibly suspended in the main frame and is vibrated through a pitman 49 pivoted to the upper end of the chute and attached to a crank 50 on the end of the blower shaft.

In Fig. 3, I have shown the hopper, 51, as arranged at the center of the main frame instead of at one end thereof and provided with a false bottom 52 which is hinged at one end, as indicated at 53, and supported at its opposite end by a link 54 connected with a crank shaft 55. As the crank shaft is rotated, the false bottom, of course, will be vibrated or shaken so that the seed upon the said false bottom will be positively fed to the conveyer 56 corresponding to the conveyer 5 in the arrangement previously described. In this modified machine, the seed passes from the hopper onto a short screen 57 which serves to separate the trash and leaves from the seed so that the said trash will be discharged over the lower end of the screen, while the seed will pass onto a pan or trough 58 and be discharged by the same onto a second screen 59. The screen 57 with the pan or trough 58 secured thereto is supported within the main frame by springs 60 and the upper end of the said screen and trough are connected by a link 61 with a crank shaft 62 so that the screen may be vibrated, as will be readily understood. Flexibly supported within the main frame, below the said screen 57 and trough 58, is the second screen 59 having attached thereto the pan or trough 63, and to the lower end of the said pan or trough 63 is secured the discharge chute 64 which leads transversely to the side of the machine to deposit the first quality seed in a suitable receptacle. The seed which passes over the perforated plates of the screen 59 will be discharged onto a third screen 65 arranged below the same and supported in the main frame by springs and flexible connections in the same manner as the other screens are supported. The screen 59 in this form of the invention has the lower end of its frame provided with a transverse bar 66 so that the seed passing over the said screen will not be permitted to flow beyond the end of the machine but will be deflected by said cross bar onto the lowermost screen 65. The pan or trough 67 carried by the screen 65 terminates short of the lower end of the said screen, and will receive the dirt and worthless seed passing through the said screen.

The second quality seed will be discharged over the end of the screen 65 and will flow in front of the blower 68 having its outlet 69 directed away from the machine so that the dust and other foreign particles adhering to the seed will be blown therefrom.

In Fig. 4, I have illustrated a further modification in which is employed a hopper 70 which is rigidly supported and contains an endless conveyer or feeding belt 71 passing over driving and supporting rollers 72 and equipped with projections or slats 73 which take into the seed and feed the same over the bottom of the hopper to the conveyer 74 corresponding in all respects to the spiral conveyers 5 and 56. A screen 75 is arranged to receive the seed and other material fed from the hopper by the said conveyer 74, and this screen is supported and operates in the same manner as the screens shown in the other previously described forms of the invention. In the previously described arrangements, the discharging chute is located at the end of the screen but it may be located at any other point, and in Fig. 5, I have shown a discharge chute 76 disposed at an intermediate point of the pan 77 to which it is secured, the said pan in the illustration being that attached to the top screen. With the chute arranged at this intermediate point, it is intended to have the perforated plates 78 of the screen so constructed and arranged that the openings below the chute will be appreciably larger than those arranged above or in advance of the chute so that the upper portion of the screen will permit only the worthless seed to pass through, while the lower portion thereof will permit all the larger seed to pass and will eliminate therefrom all the leaves and other large trash.

The transverse discharge chutes will preferably deposit the seeds in a receptacle disposed at the side of the machine but they may discharge into a longitudinal chute carried by the screens, and in Fig. 8, I have shown a chute 79 secured to the side of a screen. This side chute will, of course, be arranged to deliver the seed into a suitable receptacle and by this arrangement it will be possible to direct the seed from each screen into a suitable bin so that the seeds may be assorted in several grades. It will be understood, of course, that a transverse chute in such instance would be provided at the end or an intermediate point of each screen and arranged to deliver into a longitudinal chute at the side of the screen below it.

In all the various forms of my invention, the screens other than the top screen will be preferably equipped with the transverse combs and all the screens will be flexibly supported, as shown and as described. The several parts of the apparatus are simple in their construction and compact in their arrangement and in operation the machine will be found highly efficient.

What I claim is:—

In a seed separator, a frame, a screen, flexible means suspending one end of the screen within the frame, means yieldably supporting the other end of the screen for up and down movement, a pan supported below the screen and movable therewith, a spring connected to the frame and to that end of the pan adjacent the last-mentioned end of the screen, a second screen movably connected at one end to the last-mentioned end of the first-mentioned screen, flexible means suspending the other end of the last-mentioned screen, and means for imparting reciprocatory movement to the first-mentioned screen.

In testimony whereof I affix my signature in presence of two witnesses.

CHARLES D. PANTAZE. [L. S.]

Witnesses:
    WILLIS W. BURT,
    W. J. FELTON.